United States Patent
Ehlinger et al.

(10) Patent No.: US 6,311,217 B1
(45) Date of Patent: Oct. 30, 2001

(54) METHOD AND APPARATUS FOR IMPROVED CLUSTER ADMINISTRATION

(75) Inventors: Early David Ehlinger; Mark F. Fletcher, both of Houston, TX (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/090,603

(22) Filed: Jun. 4, 1998

(51) Int. Cl.[7] .................. G06F 15/173; G06F 13/14
(52) U.S. Cl. .................. 709/226; 709/225; 710/241; 710/240
(58) Field of Search .................... 709/223, 224, 709/225, 226; 710/200, 220, 240–244

(56) References Cited

U.S. PATENT DOCUMENTS

| | | | |
|---|---|---|---|
| 5,003,464 | * 3/1991 | Ely et al. | 714/10 |
| 5,228,127 | * 7/1993 | Ikeda et al. | 709/225 |
| 5,704,032 | * 12/1997 | Badovinatz et al. | 714/4 |
| 5,828,889 | * 10/1998 | Moiin et al. | 710/240 |
| 5,892,913 | * 4/1999 | Adiga et al. | 709/219 |
| 5,938,732 | * 8/1999 | Lim et al. | 709/229 |
| 5,964,838 | * 10/1999 | Cheung et al. | 709/224 |
| 5,999,712 | * 12/1999 | Moiin et al. | 395/200.5 |
| 6,088,727 | * 7/2000 | Hosokawa et al. | 709/223 |
| 6,108,699 | * 8/2000 | Moiin | 709/221 |
| 6,112,243 | * 8/2000 | Downs et al. | 709/226 |
| 6,151,688 | * 11/2000 | Wipfel et al. | 714/48 |
| 6,178,529 | * 1/2001 | Short et al. | 714/51 |
| 6,192,401 | * 2/2001 | Modiri et al. | 709/220 |

OTHER PUBLICATIONS

Tony Pompili, "Net Tools; No Time for Downtime", PC Magazine, Apr. 7, 1998.

* cited by examiner

Primary Examiner—Dung C. Dinh
Assistant Examiner—N Trim
(74) Attorney, Agent, or Firm—Akin Gump Strauss, Hauer & Feld. L.L.P.

(57) ABSTRACT

A cluster administration system that is capable of handling a cluster having one or more computing devices. The number of computing devices that may be included in a cluster is limited only by practical considerations rather than software or hardware limitations. A cluster administration system may include a cluster of computing devices, one of the computing devices being an owner. The cluster further includes a resource. Direct access to the resource by the computing devices is controlled by the owner of the cluster. The cluster administration system also includes an arbiter. The arbiter and the cluster are in communication with each other and a network, the cluster providing the network with access to the storage device. The arbiter controls the admission of new computing devices to the cluster when the owner of the cluster is incapable of admitting the new computing device. Having the arbiter outside the cluster provides greater reliability. The arbiter is not affected by failures within the cluster. One or more of the computing devices of the cluster may fail, but the administration of the cluster is not affected. The functions of the arbiter may also be distributed among several independent computing devices which can hand off the primary duties of the arbiter should one or more of the independent computing devices fail to satisfactorily perform the duties of arbitration.

32 Claims, 10 Drawing Sheets

METHOD AND APPARATUS FOR IMPROVED CLUSTER ADMINISTRATION

BACKGROUND OF THE INVENTION

This invention relates generally to computer systems and networks. More specifically, the invention relates to methods and apparatuses for improving the administration of a cluster of computers.

A computer cluster typically consists of a number of computers that require direct access to one or more resources, such as a shared data storage device. Clusters allow a number of computers or servers to have access to the same services. Simultaneous access to the same services is especially useful to carry out transactions from different points of entry. Every time a transaction occurs the information can be updated on a common database. This ensures that the information will remain consistent since the information is kept on the shared data storage device.

FIG. 1A is a block diagram of a prior art cluster system 100. Cluster 100 includes servers 102 and 104, small computer systems interface (SCSI) bus 106, and storage device 110. Cluster 100 is also typically connected to a network 120 through servers 102 and 104. Servers 102 and 104 are coupled to each other and storage device 110 through SCSI bus 106.

Normally, a client within network 120 will need to obtain or update information stored on storage device 110. The client will contact one of the servers 102 or 104 in order to carry out the transaction. However, one or both of the servers may not have access to the storage device 110.

Access to storage device 110 is dependent upon whether servers 102 and 104 are members of the cluster. Generally, a cluster consists of an owner and zero or more members. The owner of the cluster determines whether another computer can have access to a resource. For example, server 104 may be the owner and server 102 may not yet be member of the cluster. In that case, server 102 does not have access to a resource, in this case storage device 110.

A conventional method of determining ownership is discussed with reference to FIG. 1B and in conjunction with FIG. 1A. FIG. 1B is a flow chart 140 of a conventional method of cluster administration. The flow chart 140 begins at block 150 and proceeds to block 152. In block 152, server 102 attempts to join the cluster. Server 102 initially attempts to communicate with server 104 through network 120 in order to join the cluster as a member. Server 102 assumes that server 104 is the owner of storage device 110 because server 104 is the only other server connected to storage device 110.

In block 154, server 102 determines if the attempt to join the cluster as a member was successful. If it was successful, server 102 proceeds to block 160 and joins the cluster as a member. If the communication of block 152 was not successful, server 102 assumes that server 104 is not the owner of storage device 10.

Proceeding to block 156, server 102 attempts to gain control of SCSI bus 106. In the prior art system, control of the SCSI bus equates to control over the storage device. Server 102 then determines if its attempt to gain control over SCSI bus 106 is uncontested in block 158. If server 104 was actually the owner of the storage device, server 104 would eventually attempt to regain control over the SCSI bus 106 and the storage device 110.

If server 104 regains control over the SCSI bus, server 102 returns to block 152 and tries to attempt to join as a member through network 120 since it is clear that server 104 is the owner. On the other hand, if no other server has regained control over the SCSI bus 106 and the storage device 110, server 102 joins the cluster as the owner of the SCSI bus 106 and the storage device 110 in block 159. When server 102 has joined the cluster as a member in block 160, or as the owner in block 159, the processing ends in block 162.

The conventional method and system of cluster administration have many flaws. For example, conventional cluster systems are generally limited to only those servers or computers that can directly communicate with a common resource. The conventional software system's is typically incapable of handling more than two servers per resource. The limitation of two computers severely limits the versatility and reliability of the cluster. Should one of the servers fail, only one server would be left to provide access to the resource to the network. Further, having only two points of access to the resource limits the frequency of transactions that may be performed with the resource. Thus, the operation of the network may be hindered due to the latencies involved in transactions with the resource.

A cluster system that includes more than two access points would provide greater versatility. Additionally, a cluster system with an independent entry system would increase reliability and decrease transactional arbitration requirements in order to gain access to a storage device.

SUMMARY OF THE INVENTION

The present invention provides a cluster administration system that is capable of handling a cluster having one or more computing devices. The number of computing devices that may be included in a cluster is limited only by practical considerations.

In one embodiment, a cluster administration system includes a cluster of computing devices, one of the computing devices being an owner. The cluster further includes a storage device. Direct access to the storage device by the computing devices is controlled by the owner of the cluster. The cluster administration system also includes an arbiter. The arbiter and the cluster are in communication with each other and a network, the cluster providing the network with access to the storage device. The arbiter controls the admission of new computing devices to the cluster when the owner of the cluster is incapable of admitting the new computing device.

In another embodiment, the arbiter determines which of the computing devices in the cluster is designated as the owner of the cluster. The arbiter can assign a new owner if the current owner looses communication with the arbiter. Also, if the current owner is incapable of admitting a new computing device to the cluster, the arbiter is configured to admit the new computing device as the new owner of the cluster, in another embodiment.

In a further embodiment, the arbiter is implemented on an independent computing device that is independent of the cluster of computing devices. The independent computing device is in communication with the cluster and the network, such that a new computing device desiring to enter the cluster can communicate with the independent computing device through the network.

In yet another embodiment, the arbiter is distributively implemented on an independent cluster of computing devices that is independent of the cluster of computing devices. The independent cluster of computing devices is in communication with the cluster and the network. A first independent computing device of the independent cluster primarily acts as the arbiter for the cluster of computing devices. If the first independent computing device is incapable of primarily acting as the arbiter, a second independent computing device of the independent cluster primarily acts as the arbiter for the cluster of computing devices. In an alternative embodiment, two clusters of computing devices act as arbiters for each other. Any number of clusters may act as arbiters for each other.

Independent arbitration removes some of the burden of cluster administration from the owner. Reliability of the administration of the cluster also is increased. The computing devices of the cluster, and computing devices desiring to enter the cluster need only be able to communicate with the arbiter. When new computing devices are added to a cluster there is no contention for ownership because the arbiter determines which of the computing devices is the owners. Reducing contentions provides better efficiency and reliability.

Having the arbiter outside the cluster provides greater reliability. The arbiter is not affected by failures within the cluster. One or more of the computing devices of the cluster may fail, but the administration of the cluster is not affected. The functions of the arbiter may also be distributed among several independent computing devices which can hand off the primary duties of the arbiter should one or more of the independent computing devices fail to satisfactorily perform the duties of arbitration.

These and other advantages of the present invention will become apparent to those skilled in the art upon a reading of the following descriptions of the invention and a study of the several figures of the drawing.

DETAILED DESCRIPTION OF THE INVENTION

The present invention provides an improved cluster administration system. The improved cluster administration system includes independent entry arbitration, providing greater reliability and versatility. Scalability is also achieved by the present invention without increasing the transactional overhead. Scalability allows one or more computers or servers per cluster. That is, any number of servers may be able to directly communicate with a common shared resource. Also, scalability allows more than one common resource to belong to a cluster. More points of entry and more functionality are thereby achieved by the present invention.

The present invention contemplates an independent arbiter that controls the admission of computers and servers into a cluster. Independent arbitration increases the efficiency of the servers actually in the cluster because they no longer need to deal with entry arbitration. This issue becomes more important since the number for potential cluster members is increased. Having a number of potential members fighting for control over a bus would severely hamper the efficiency of a cluster.

Figure 1A:
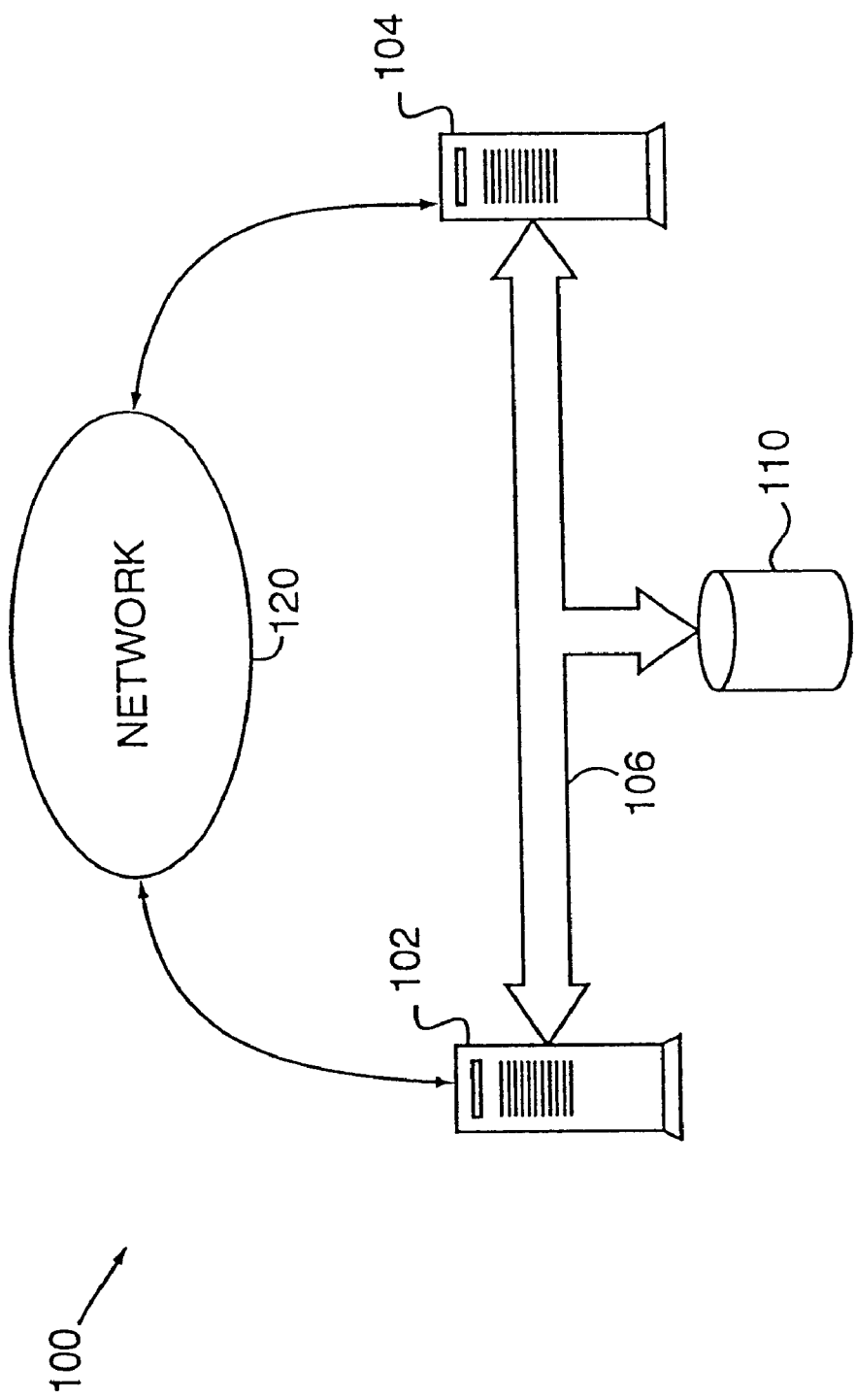
FIG. 1A is a block diagram of a prior art clustering system.
Figure 1B:
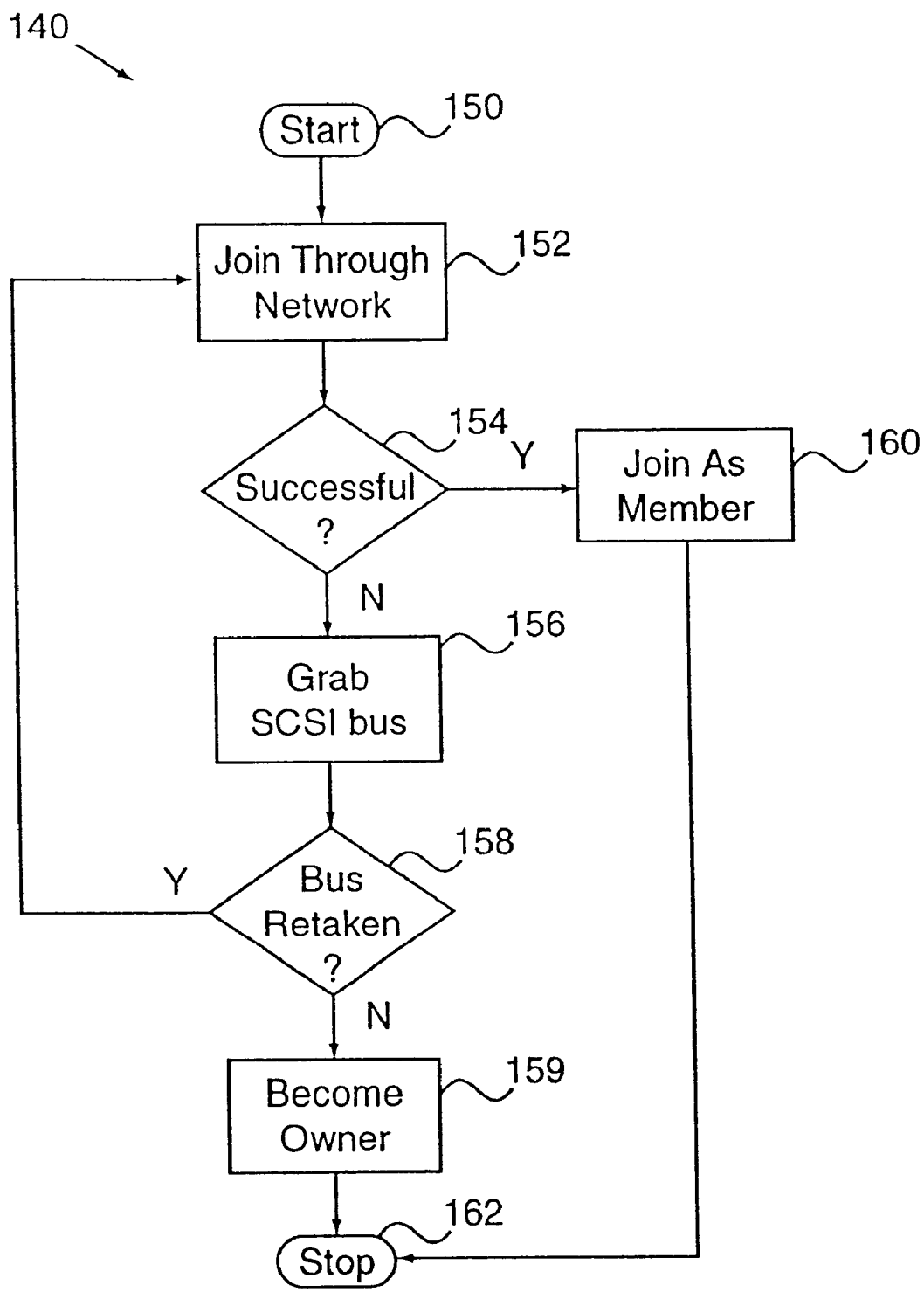
FIG. 1B is a flow chart of a conventional method of cluster administration.
Figure 2:
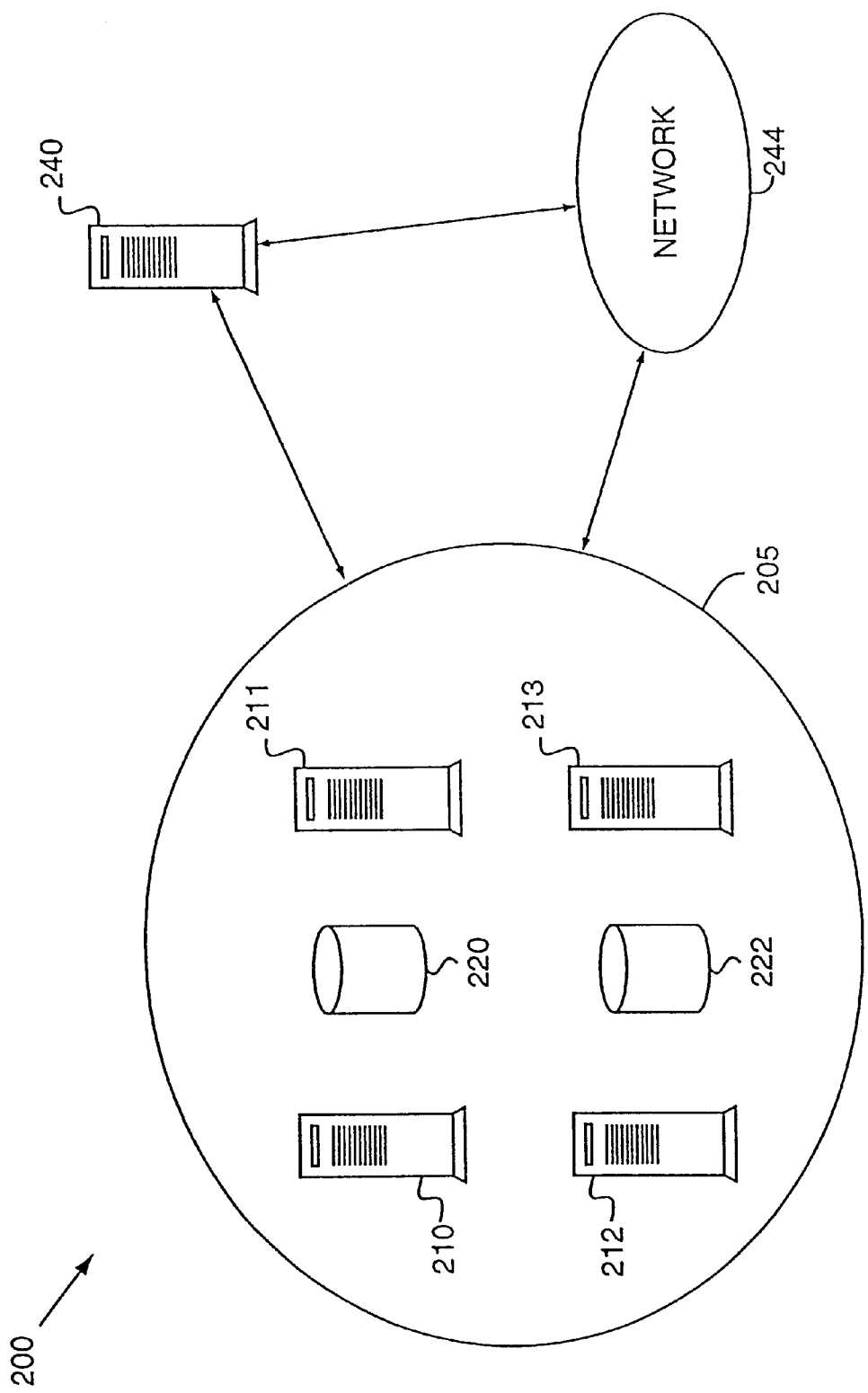
FIG. 2 is a block diagram of an improved cluster administration system in accordance with one embodiment of the present inventions.

FIG. 2 is referred to in order to facilitate discussion of an improved cluster administration system. FIG. 2 is a block diagram of an improved cluster administration system 200 in accordance with one embodiment of the present invention. Improved cluster administration system 200 includes a cluster 205 and an arbiter 240. The present invention is discussed below with reference to shared storage devices. However, the present invention may be applied to any suitable type of shared resource.

Cluster 205 includes a number of servers 210–213 and a number of common storage devices 220 and 222. Servers 210–213 and storage devices 220 and 222 are able to directly communicate with each other within the cluster. Interconnection between the servers and the storage devices are not limited to a SCSI bus. Instead, any type of interconnective medium may be utilized to couple the servers and the storage devices. By way of example, a local area network, a wide area network, ethernet network, token ring network or any other suitable interconnective apparatus, in addition to a SCSI bus, may be utilized in accordance with the present invention. Additionally, any suitable type of protocol, e.g., TCP/IP or NetBEUI may be utilized.

The cluster is also connected to arbiter 240 and a network 244. The arbiter is connected to cluster 205 and is generally capable of communication with all the members of the cluster. The arbiter is also coupled to network 244 and may be able to communicate with members of the cluster 205 through the network 244.

Arbiter 240 handles all entry arbitration for cluster 205. Since arbiter 240 is outside the cluster, none of the members of the cluster 205 is burdened with entry arbitration. Further, the independence of the arbiter 240 adds further reliability to the cluster 205, as discussed further below. The arbiter 240 need not be an actual computing device. Instead, the arbiter 240 may be a process operating on a computing device. However, for purposes of brevity, further discussion will refer to an arbiter 240 as a computing device or server.

In one embodiment, the connections between all the elements of cluster 205 and arbiter 244 with network 244 should be as reliable as possible. One method of ensuring reliable connections is to utilize multiple connection network interface devices (i.e., redundant devices) to couple all the different devices. Multiple connection network interface devices allow two or more simultaneous connections to be maintained between computing or communication devices. An example of a multiple connection network interface device is the Compaq Netelligent Dual 10/100TX PCI UTP Controller, manufactured by Compaq Computer Corporation, Houston, Tex. 77269–2000.

Figure 3:
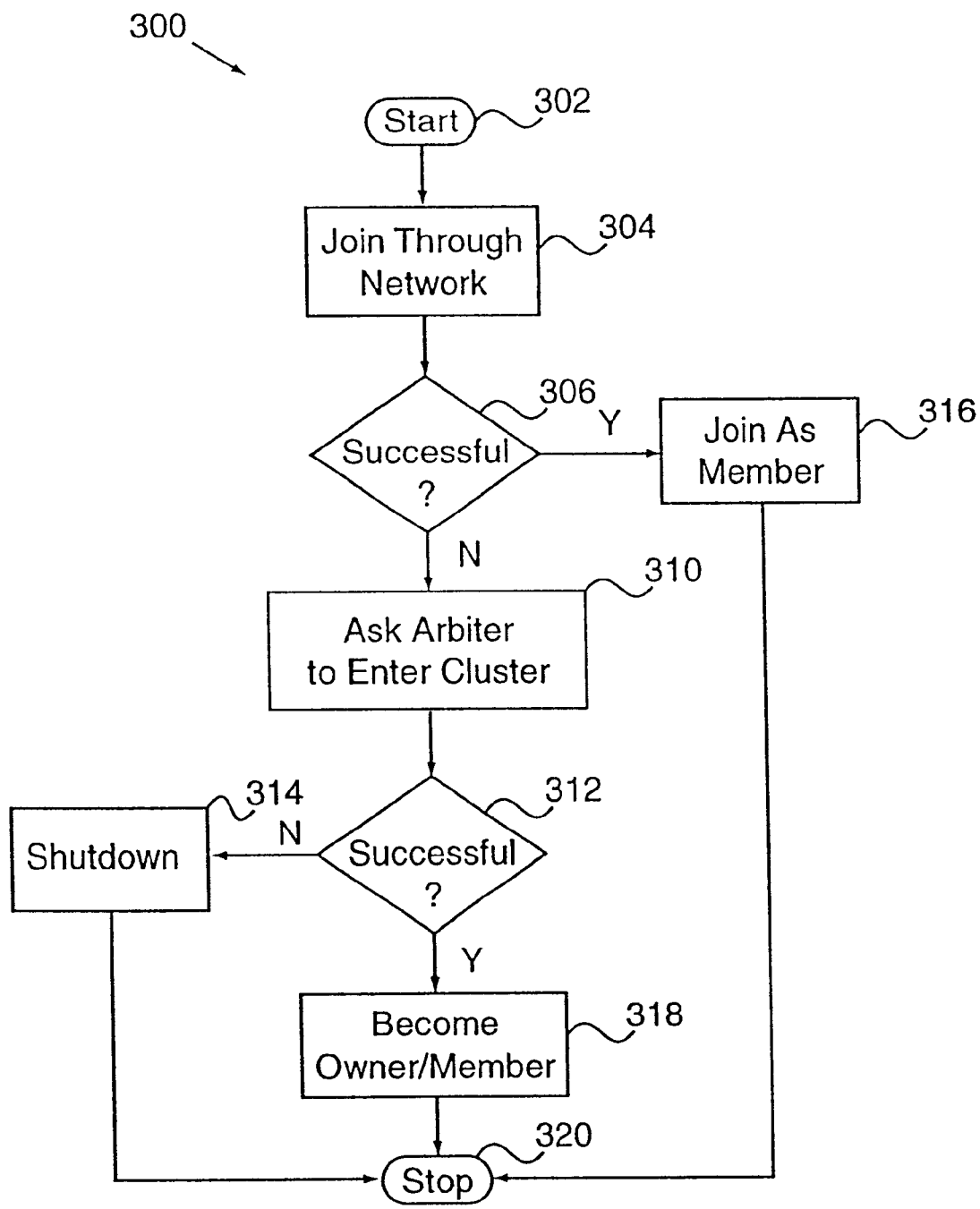
FIG. 3 is a flow chart of a method of entry arbitration in accordance with one embodiment of the present inventions.

FIG. 3 is a flow chart 300 of a method of entry arbitration in accordance with one embodiment of the present invention. Flow chart 300 depicts an exemplary operation of a server attempting to join a cluster. By way of example, referring back to FIG. 2, server 212 may not belong to cluster 205 and may attempt to join the cluster 205 in order to gain access to one or both of storage devices 220 and 222.

Server 212 initiates a routine in block 302 and proceeds to block 304. The routine may be any type of routine that may be performed by a computing device connected to the cluster 205 and/or network 244. In one embodiment, server 212 and cluster 205 may be operating in a Windows® environment. Server 212 may then initiate a dynamic link library (DLL) in order to attempt to join the cluster 205. However, any set of operations capable of being performed by a computing or communication device may be utilized in accordance with the present invention.

In block 304, server 212 attempts to join the cluster 205 through network 244. If, for example, server 210 is the owner of one or more of storage devices 220 and 222, server 212 would request admission to the cluster 205 through server 210 through network 244.

In one embodiment the server 212 may ask the arbiter 240 who is the owner of storage devices 220 and 222. The arbiter 240 then informs server 212 that server 210 owns the storage devices such that server 212 may then request admission to the cluster. In another embodiment, server 212 may send out a network wide message to determine who owns storage devices 220 and 222. Or both methods ray be utilized such that server 212 is informed of the identity of the owner of storage devices 220 and 222.

One advantage of the present invention is that server 212 need only be able to communicate with server 210 in order to join the cluster. More generally a device may join a cluster if there is open communication between the device and an arbiter of the cluster. There is no need to contend for actual possession of a bus connecting the device to a storage device of the cluster. Therefore, so long as the arbiter is capable of receiving communications from the requesting device, the device may be admitted to the cluster. Of course, the requesting device should also be able to communicate with the storage device or devices of the cluster.

Proceeding to block 306, server 212 determines if it has successfully obtained admission access from server 210. If server 210 is the owner of the cluster 205, it would typically admit any servers requesting to enter the cluster in response to a request, as in block 304. Reasons for admissions failure are generally due to communication problems rather than rejection by the owner. If the request is successful, server 212 enters the cluster 205 as a member in block 316. If the request is not successful, server 212 attempts to enter the cluster by contacting arbiter 240 through network 244 in block 310.

In one embodiment, the illustrated routine may be incorporated into a conventional routine that would normally attempt to take over the common bus. However, in that embodiment, the illustrated routine intercepts any such take over attempts, and redirects the operations of server 212 to arbitrate with arbiter 240. Thus, the present invention may be incorporated into conventional cluster arbitration systems by modifying them accordingly.

Server 212 determines if the request to the arbiter 240 is successful in block 312. If the request to arbiter 240 is successful, server 212 proceeds to block 318 and enters the cluster 205 as a member, or as the owner of the desired storage device 220 OR 222 or the entire cluster 205.

If the request to the arbiter 240 is not successful, server 212 may be having some type of hardware communication problem. In which case, server 212 is shut down in block 314. In an alternative embodiment, server 212 may return to block 304 and attempt to gain entry a number of times before shutting down. If server 212 shuts down in block 314 or enters the cluster 250 in either blocks 316 or 318, the process of entry ends in block 320.

Figure 4:
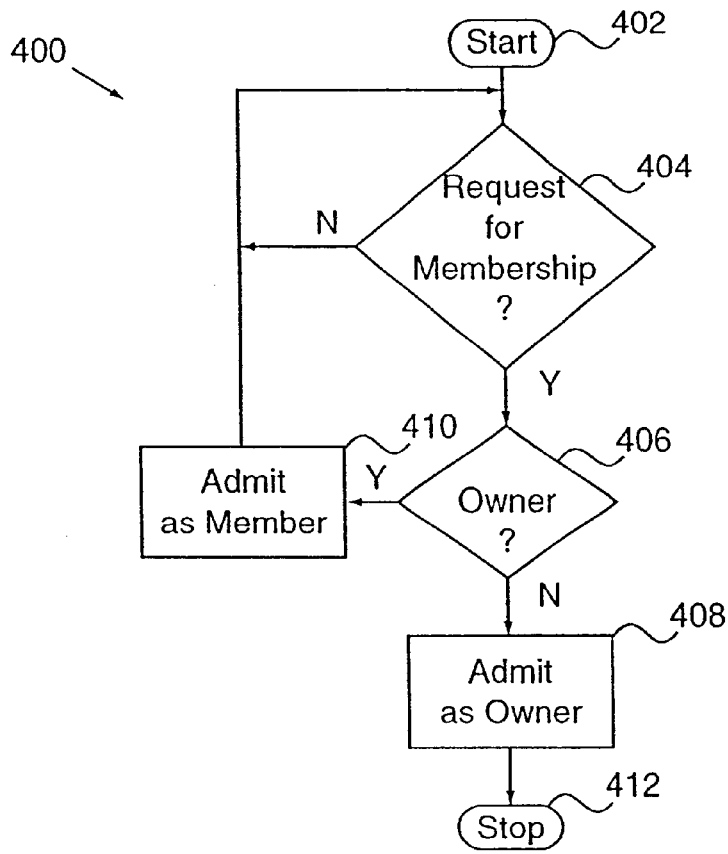
FIG. 4 is a flow chart of the operations of an arbiter in accordance with one embodiment of the present inventions.

The operations of the arbiter 240 are discussed in reference to FIG. 4. FIG. 4 is a flow chart 400 of the operations of the arbiter 240 in accordance with one embodiment of the present invention. Operations begin at block 402 and proceed to block 404. In block 404, arbiter 240, waits for a request from a server to become a member of the cluster 205.

Once arbiter 240 receives a request for membership, operations proceed to block 406. The arbiter 240 then ascertains whether a current owner exists for the requested cluster 205, or storage device 220 or 222, in block 406. If there is an active owner of the cluster 205 or storage device 220 or 222, the requesting device is admitted as a member of that cluster 205 in block 410. Arbiter 240 then waits for the next request in block 404. On the other hand, if there is no active owner of the requested cluster 205, the arbiter 240 admits the requesting server as the owner of the cluster 205 in block 408. Block 408 is, in one embodiment, a subroutine that is initiated once an owner is assigned, which is discussed further below. Once the requesting server is admitted, operations end in block 412. Again, the operations discussed may be performed by a process operating on one or more devices that are independent of the cluster.

Figure 5:
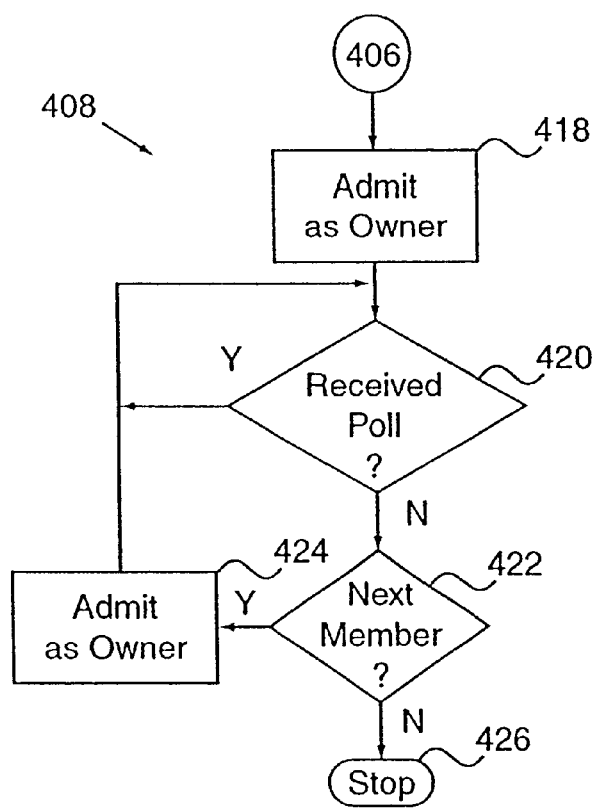
FIG. 5 is a flow chart of the operations of block 408 of FIG. 4 in accordance with one embodiment of the present inventions.

FIG. 5 is a flow chart of the operations of block 408 of FIG. 4 in accordance with one embodiment of the invention. The operations of the flow chart are initiated from block 406 of FIG. 4. In block 418, the arbiter 240 admits the requesting server into the cluster 205 as an owner since no active owner exists for the cluster 205.

Once an owner is established for a cluster 205, the arbiter 240 must make sure that the owner remains active. When the owner is initially established, the owner is required to maintain periodic communication with the arbiter 240 to indicate that the owner is still active. In block 420 the arbiter 240 waits for the polling signal from the owner of a cluster 205. If, within a predetermined interval of time, the owner fails to communicate with the arbiter 240, the arbiter 240 proceeds to block 422.

In block 422 the arbiter 240 checks to see if there are other current members in the particular cluster 205. If other members exists, the arbiter 240 assigns one of them as the new owner of the cluster 205 in block 424. Thus, if at any time the arbiter 240 loses communications with the owner of a cluster 205, the arbiter 240 can dynamically assign a new owner.

At the same time, the previous owner shuts down if it cannot successfully poll the arbiter 240. In this manner only those owners that can maintain communications with the arbiter 240 remain active. Verified communications prevent simultaneous access to one or more of the storage devices within a cluster, which would cause conflicts and errors in the stored information.

If no other members exist within a particular cluster, the arbiter 240 stops the operations of that particular subroutine in block 426. The lack of members indicates that the cluster 205 is no longer active or that only the owner was a member of the cluster 205. The dropped owner may attempt to regain membership after it has been dropped, as discussed in reference to FIG. 4.

Independent arbitration permits increased scalability. Some conventional clusters are typically limited to two servers due to software limitations. Despite software limitations, conventional systems are also normally limited to a small number of servers due to the physical limitations of the SCSI bus interface. Other conventional cluster systems permit more than two servers to exist in a cluster. However, their system of arbitration is typically limited to a simple majority method.

Simple majority is typically used in prior art cluster systems. When a device attempts to enter a more conventional cluster the device attempts to gain communication with all the members of the cluster as well as any other devices attempting to join the cluster. If the device cannot communicate with a simple majority of the members of the cluster and the other joining devices then the device cannot join the cluster. If the device does become a member the device must maintain communication with a simple majority of the cluster through periodic "heartbeats". Failing to do so causes the devices to be omitted from the cluster.

A problem with this system is that if a cluster contains nodes, half or fewer of which are viable (i.e., not broken or crashed), those members will go unused because they will not be able to become members of the cluster or start servicing requests. Also, if a majority of the devices in a cluster fail there is the potential that the entire cluster will fail because of the lack of communication between a majority of the members of the cluster.

The present invention may be utilized in conjunction with any networking configuration and allows the number of servers or computers that can access a storage device to be significantly increased. By having an arbiter 240 reside outside a cluster, any number of cluster members may be admitted so long as they can effectively communicate with the arbiter.

Figure 6:
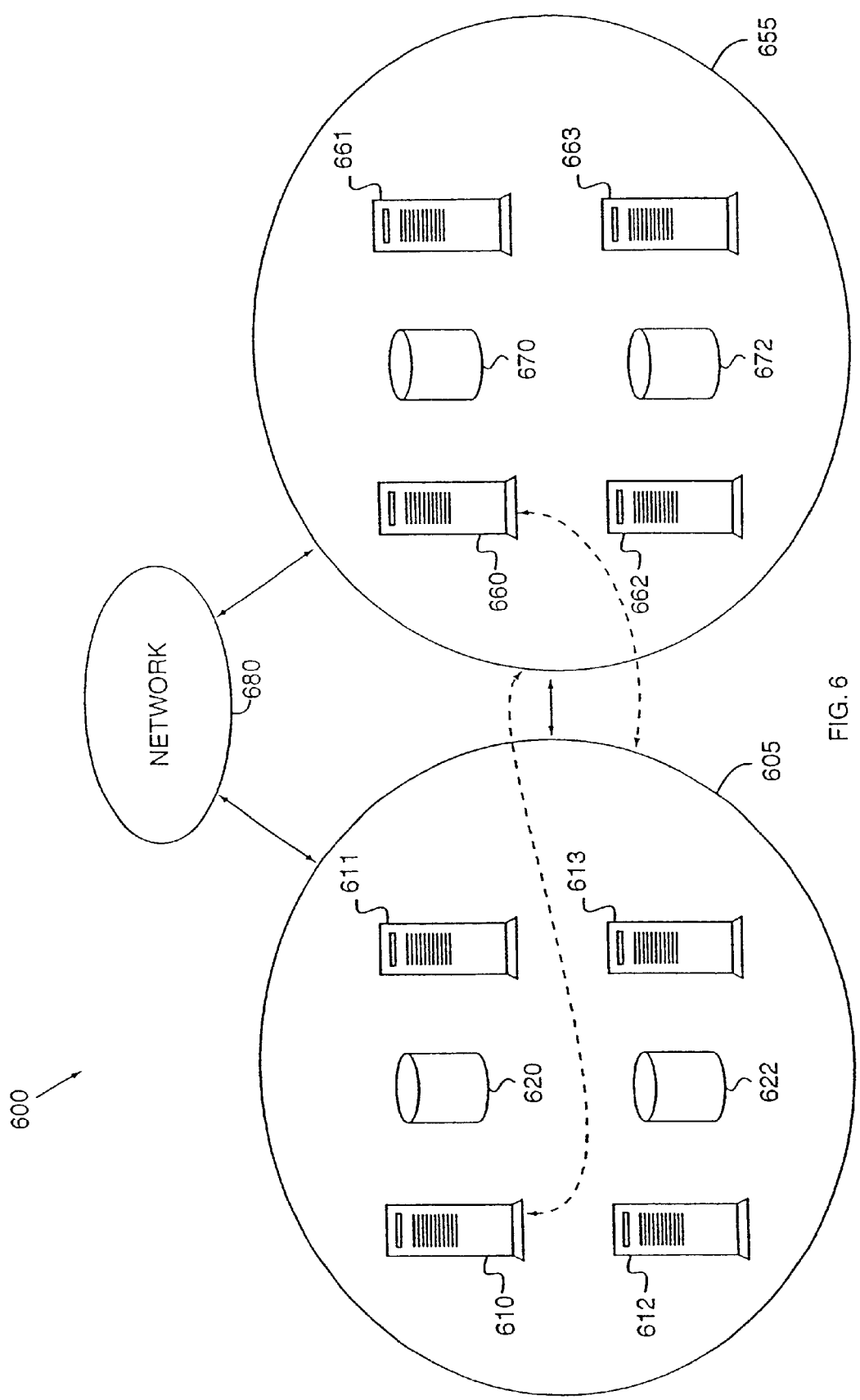
FIG. 6 is a block diagram of an improved cluster administration system in accordance with another embodiment of the present inventions.

The features of the present invention may be embodied in many different configurations in addition to the embodiments previously discussed. FIG. 6 is a block diagram of another embodiment of an improved cluster administration system 600. The improved cluster administration system 600 includes two clusters 605 and 655. Each cluster 605 and 655 is communicatively coupled to a network 680.

Cluster 605 includes servers 610–613 and storage devices 620 and 622. Cluster 655 similarly includes servers 660–663 and storage devices 670 and 672. The elements of each cluster 605 and 655 are able to communicate with the other elements of the same cluster. The clusters 605 and 655 are also in communication with each other.

Interconnecting two or more clusters together (such as illustrated in FIG. 6) allows the clusters to act as arbiters for each other. By way of example, server 660 may act as an arbiter for cluster 605. The added advantage of the particular embodiment is that the task of arbitration may be performed by any server within the cluster. Should server 660 for any reason fail, one of the other servers 661–663 would ordinarily be capable of carrying out the task of being the arbiter for cluster 605. In a similar fashion, any one of servers 610–613 may act as the arbiter for cluster 655. The method of arbitration discussed in reference to FIGS. 3–5 is readily applicable to the illustrated embodiment.

A potential problem may occur when clusters act as arbiters for each other. When both clusters are booting up, or initializing, neither cluster may be able to act as an arbiter. In one embodiment, a server from each cluster may be designated as a "bootstrap" arbiter. For example, servers 610 and 660 may be designated is "bootstrap" arbiters. During the boot up process servers 610 and 660 are allowed to come up first and service requests from the corresponding cluster it to allow to fully initialize.

Figure 7:
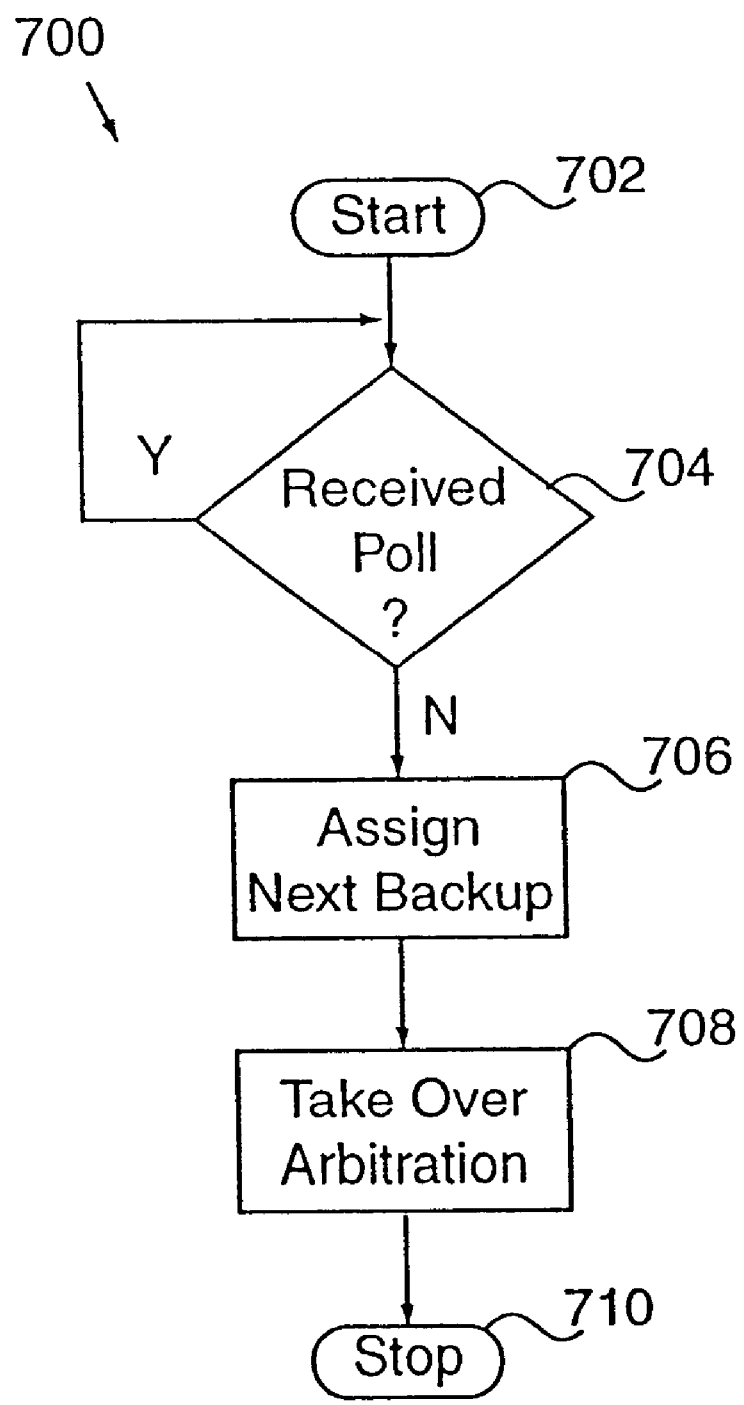
FIG. 7 is a flow chart of the process of swapping arbiters in accordance with an embodiment of the present inventions.

FIG. 7 is a flow chart 700 of the process of swapping arbiters in accordance with an embodiment of the present invention. The operations are carried out by a server that is not the current arbiter. By way of example, if server 650 is the arbiter for cluster 605, the following operations may be performed by server 661 (or any or all of the other servers 662–663). Flow chart 700 begins at block 702 and proceeds to block 704. In block 704, server 661 actively polls server 660 (the current arbiter) to ensure that server 660 is active. Should server 660 not respond within a predetermined amount of time server 661 takes over as the new arbiter for cluster 605.

Proceeding to block 706, server 661 assigns a new back up server. In the exemplary embodiment, server 661 can designate server 662 or 663 as the new back up server. That server 662 or 663 then performs the operations (e.g., polling) described above. Server 661 then takes over the arbitration duties for cluster 605 in block 708. Arbitration duties are described in detail with reference to FIGS. 4 ard 5. Thereafter, the process ends in block 710.

This process is often times referred to as "failover". Thus, successful failover transfer may be accomplished between arbiters rather than between owners or entire clusters.

Multi-cluster arbitration further increases the reliability of cluster administration. Rather than relying upon a single server to perform the arbitration functions, as in many prior art systems, the task of arbitration may be spread across (or distributed) several servers and/or computers. Thus, the risk of a complete failure of all arbitration functions is drastically reduced.

The routine just described may be performed in many alternate ways. The arbitration process may be running as a distributed process over one or all of the servers within a cluster. Thus, shifting arbitration tasks may be performed with little effort or disruption. Also, the task of arbitration may also be shifted for other reasons than the failure of the current arbiter. By way of example, workload, bandwidth, preconfigured timing or any other suitable criteria may be used for shifting the arbitration burden.

Figure 8:
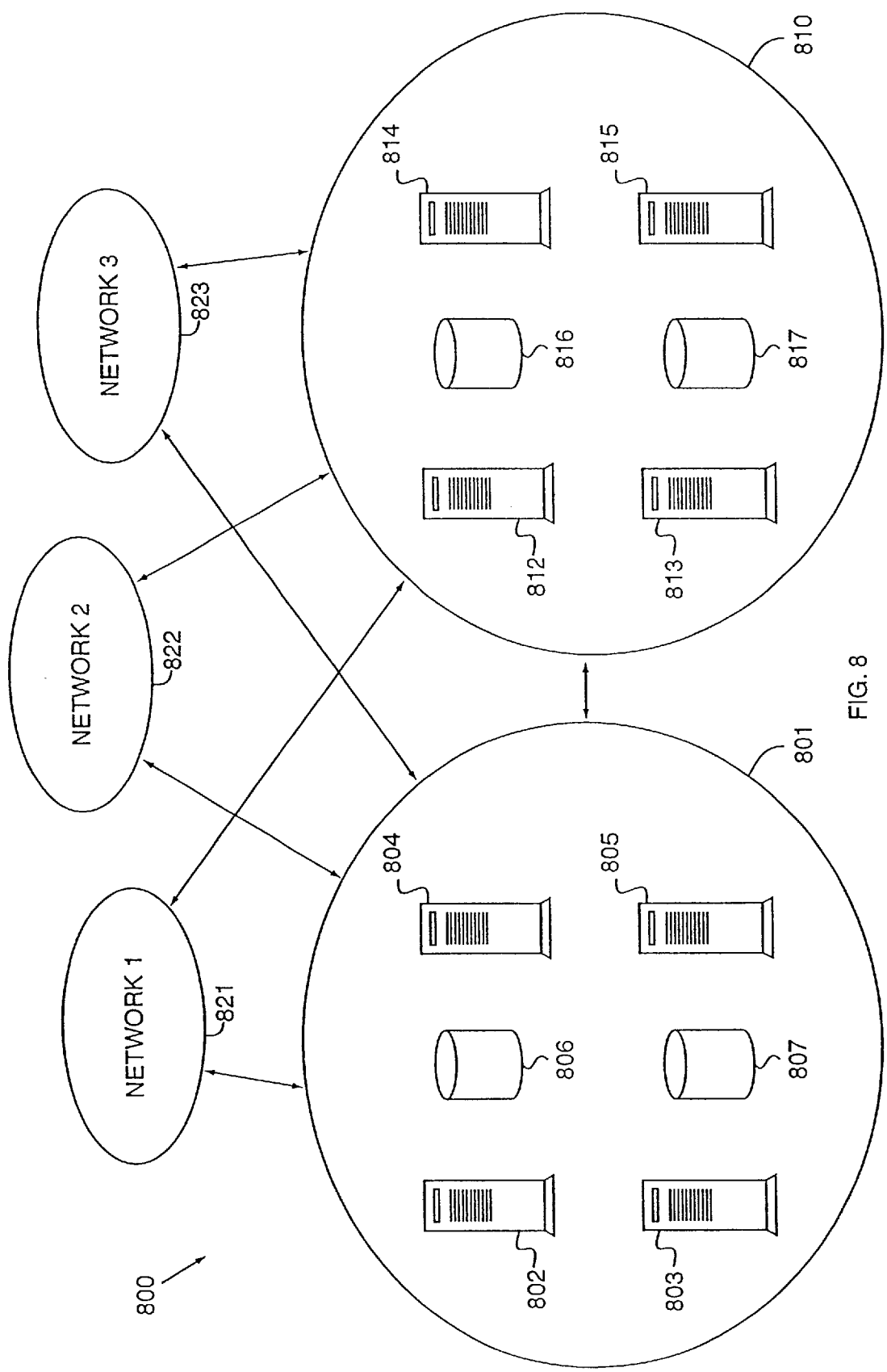
FIG. 8 is a block diagram of an improved cluster administration system in accordance with yet another embodiment of the present inventions.

Not only does multi-cluster arbitration increase reliability, it also permits greater versatility with regard to the number of networks that may be serviced by a single cluster. FIG. 8 is a block diagram of an improved cluster administration system 800 in accordance with another embodiment of the present invention. Cluster administration system 800 includes two clusters 801 and 810, both of which are connected to networks 821–823.

Clusters 801 and 810 may service any number of networks due to the increased reliability provided by the scalability of the present invention. Cluster 801 includes servers 802–805 and storage devices 806–807. Cluster 810 includes servers 812–815 and storage devices 816–817.

In one embodiment, cluster 801 may service all three networks 821–823. For each network serviced by cluster 801, one of the servers of cluster 810 act as the arbiter for that particular network/cluster combination. A single server (812, 813, 814 or 815) may act as the arbiter for any cluster connected to one of the three networks if the particular server is connected to all the networks.

At the same time, cluster 801 may act as the arbiter for cluster 810 for one or all of the networks. The clusters may act as reciprocal arbiters for each other. The system can be expanded to allow any number of clusters to act as arbiters for each other for any number of networks. Even greater redundancy may be built into the system by having a back-up cluster for a cluster acting as an arbiter. Should all the servers of a cluster acting as an arbiter fail, another designated cluster may take over the duties of cluster administration.

Figure 9:
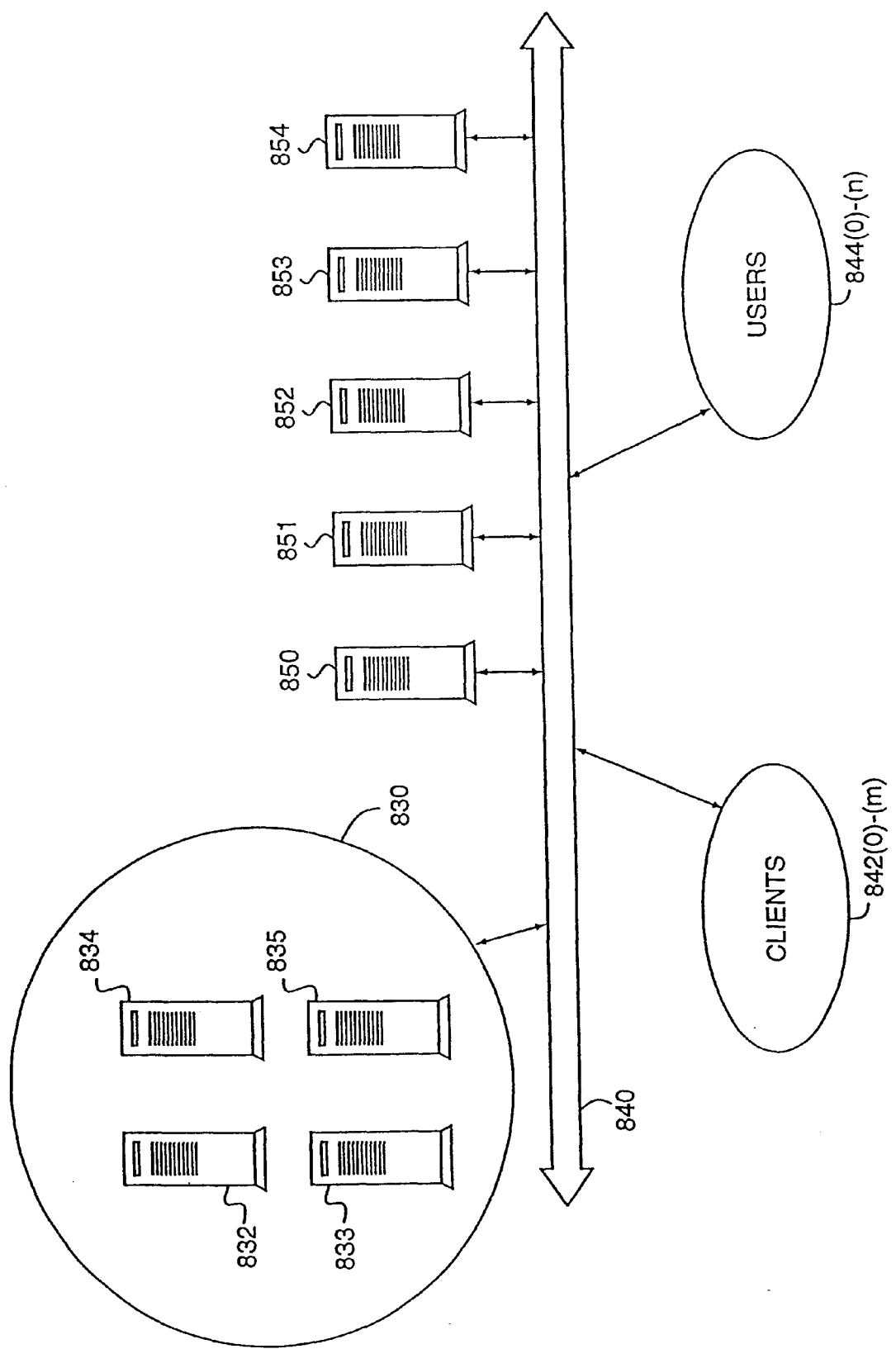
FIG. 9 is a block diagram of an improved cluster administration system in accordance with a further embodiment of the present inventions.

In another embodiment, a cluster may act as arbiters for a bank of storage devices that are available to a large number of points of entry. FIG. 9 is a block diagram of an improved cluster administration system in accordance with yet another embodiment of the present inventions.

Cluster 830 includes servers 832–835, and may also include storage devices. Cluster 830 is connected to a communication path 840. The communication path 840 can be any network or bus, such as the Internet. Connected to the communication path are an array of servers 850–854. The array of servers 850–854 are also members of cluster 830.

Servers 850–854 may individually store different categories of information. The information may be accessed by a number of clients 842 and users 844. By way of example, clients 842(0)–(m) may be vendors on the World Wide Web and users 844(0)–(n) may be customers wishing to purchase items from the clients. Servers 850–854 may then maintain information regarding universal resource locator addresses, web pages, file transfer protocol (ftp) data, databases, print spooling or other types of information.

Servers 832–835 may act as the arbiters for the array of servers 850–854. Servers 850–854 may perform connectivity tests to ensure that clients 842(0)–(m) and users 844(0)–(n) have access to them. For example, in one embodiment, server 851 may act as an ftp server for a certain number of clients, e.g., clients 842(0)–(5). In order to make sure that all or most of the designated clients 842(0)–(5) have access to server 851, server 851 can poll those clients. Server 851 may initiate a "ping" operation to all the designated clients. Alternately, the "ping" may be initiated by a router directly down stream from server 851, or from one of the potential arbiter servers 832–835. In further embodiments, the server acting as the arbiter 832–835 may initiate the "ping".

If most, or all of the designated clients respond then server 851 knows that it is open to all or most of the designated clients. If a certain number of designated clients fail to respond, server 851 may request that another server 832–835, 850 or 852–854 take over the functions of server 851. The same procedure may be performed for polling users 844(0)–(n). Additionally, the servers 850–854 may request another server to take over its functions for other reasons, such as, network interface card failure, and other hardware and software problems that may inhibit that server's ability to perform its function. The arbiter, one of servers 832–835 facilitate the transfer of duties of one server to another within the cluster.

In this manner, among others, a clustered arbiter provides greater functionality. The clustered arbiter can dynamically allocate the functions of the servers that service the clients and the users. Again, clustering of servers 832–835 to perform the arbiter functions adds reliability to the system. Any one of servers 832–835 may act as the arbiter for cluster 830 and servers 850–854. Also, servers 832–835 may act as back ups for servers 850–854.

The present invention employs various computer-implemented operations involving program code and data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should be remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 10:
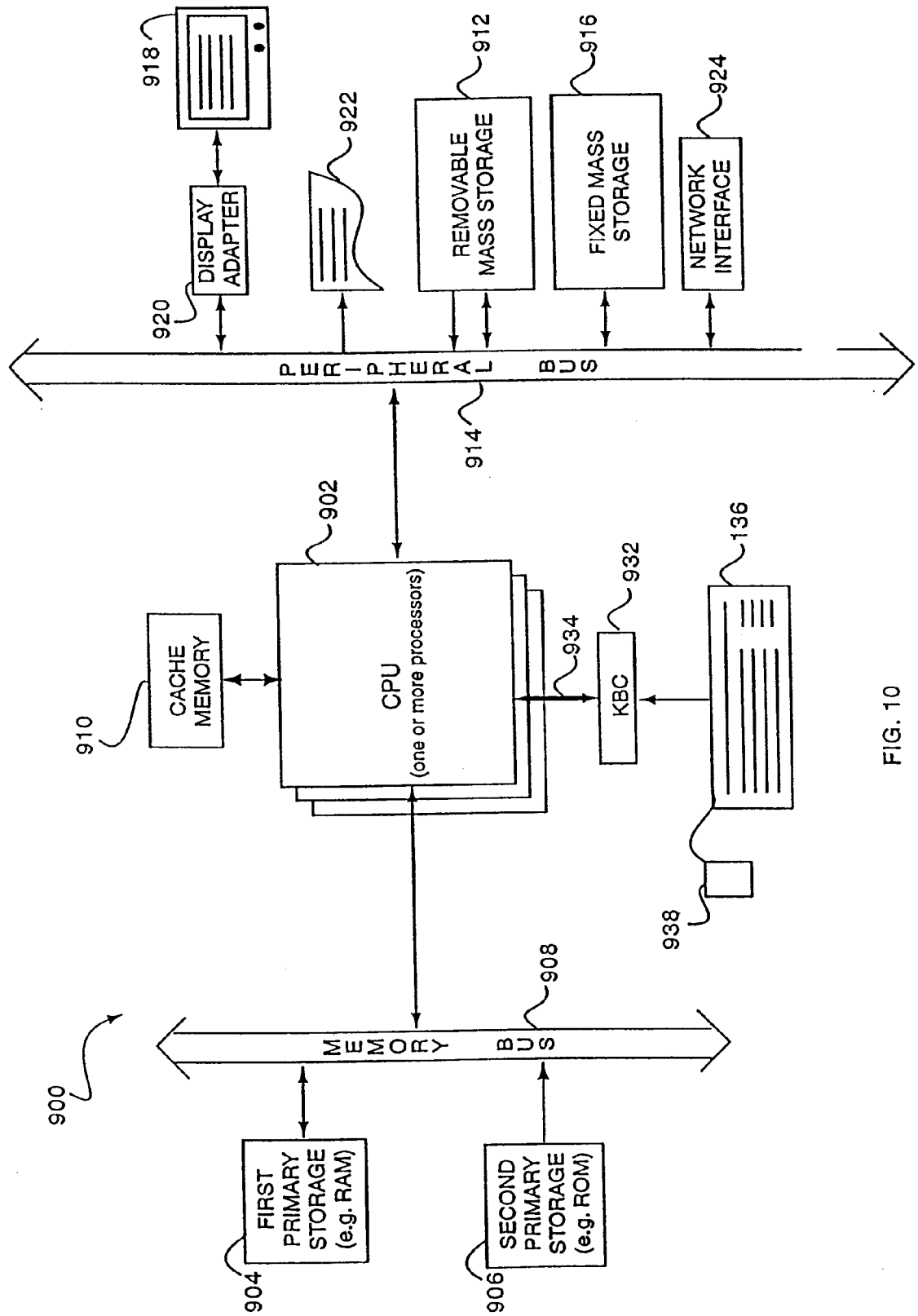
FIG. 10 is a block diagram of a general purpose computer system suitable for acting as an arbiter in accordance with one embodiment of the present invention.

FIG. 10 is a block diagram of a general purpose computer system 900 suitable for carrying out the processing in accordance with one embodiment of the present invention. Namely, as an example, any of the servers can have a construction similar to that illustrated in FIG. 10. FIG. 10 illustrates one embodiment of a general purpose computer system. Other computer system architectures and configurations can be used for carrying out the processing of the present invention. Computer system 900, made up of various subsystems described below, includes at least one microprocessor subsystem (also referred to as a central processing unit, or CPU) 902. That is, CPU 902 can be implemented by a single-chip processor or by multiple processors. CPU 902 is a general purpose digital processor which controls the operation of the computer system 900. Using instructions retrieved from memory, the CPU 902 controls the reception and manipulation of input data, and the output and display of data on output devices.

CPU 902 is coupled bi-directionally with a first primary storage 904, typically a random access memory (RAM), and uni-directionally with a second primary storage area 906, typically a read-only memory (ROM), via a memory bus 908. As is well known in the art, primary storage 904 can be used as a general storage area and as scratch-pad memory, and can also be used to store input data and processed data. It can also store programming instructions and data, in the form of data objects, text objects, data constructs, databases, message stores, in addition to other data and instructions for processes operating on CPU 902, and is typically used for fast transfer of data and instructions in a bi-directional manner over the memory bus 908. Also as well known in the art, second primary storage 906 typically includes basic operating instructions, program code, data and objects used by the CPU 902 to perform its functions. Primary storage devices 904 and 906 may include any suitable computer-readable storage media described below. CPU 902 can also directly and very rapidly retrieve and store frequently needed data in a cache memory 910.

A removable mass storage device 912 provides additional data storage capacity for the computer system 900, and is coupled either bi-dirctionally or uni-directionally to CPU 902 via a peripheral bus 914. For example, a specific removable mass storage device commonly known as a CD-ROM typically passes data uni-directionally to the CPU 902, whereas a floppy disk can pass data bi-directionally to the CPU 902. Storage 912 may also include computer-readable media such as magnetic tape, flash memory, signals embodied on a carrier wave, ⁻PC-CARDS, portable mass storage devices, holographic storage devices, and other storage devices. A fixed mass storage 916 also provides additional data storage capacity and is coupled bi-directionally to CPU 902 via peripheral bus 914. The most common example of mass storage 916 is a hard disk drive. Generally, access to these media is slower than access to primary storage devices 904 and 906. Mass storage 912 and 916 generally store additional programming instructions, data, and the like that typically are not in active use by the CPU 902. It will be appreciated that the information retained within mass storage 912 and 916 may be incorporated, if needed, in standard fashion as part of primary storage 904 (e.g. RAM) as virtual memory.

In addition to providing CPU 902 access to storage subsystems, the peripheral bus 914 is used to provide access other subsystems and devices as well. In the described embodiment, these include a display monitor 918, a display adapter 920, a printer device 922, a network interface 924 and other subsystems as needed.

The network interface 924 allows CPU 902 to be coupled to another computer, computer network, or telecommunications network using a network connection as shown. More particularly, network interface 924 permits CPU 902 to be coupled to other devices within a cluster or to another cluster. Through the network interface 924, it is contemplated that CPU 902 might receive information, e.g., data objects or program instructions, from another network, or might output information to another network in the course of performing the above-described operations of the invention.

Information, often represented as a sequence of instructions to be executed on a CPU, may be received from and outputted to another network, for example, in the form of a computer data signal embodied in a carrier wave. Network interface 924, e.g., an interface card or similar device and appropriate software implemented by CPU 902, may be used to connect the computer system 900 to an external network and transfer data according to standard protocols. That is, method embodiments of the present invention may execute solely upon CPU 902, or may be performed across a network such as the Internet, intranet networks, clusters or local area networks, in conjunction with a remote CPU that shares a portion of the processing. Additional mass storage devices (not shown) may also be connected to CPU 902 through network interface 924.

Also coupled to the CPU 902 is a keyboard controller 932 via a local bus 934 for receiving input from a keyboard 936 or a pointer device 938, and sending decoded symbols from the keyboard 936 or pointer device 938 to the CPU 902. The pointer device 938 may be a mouse, stylus, track ball, or tablet, and is uselul for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constlucted for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements in FIG. 9 are of standard design and construction. Other computer systems suitable for use with the invention may include additional or fewer subsystems. In addition, memory bus 908, peripheral bus 914, and local bas 934 are illustrative of any interconnection scheme serving to link the subsystems. For example, a local bus could be used to connect the CPU 902 to fixed mass storage 916 and display adapter 920. The computer system shown in FIG. 10 is thus but an example of a computer system suitable for use with the invention. Other computer architectures having different configurations of subsystems may also be utilized.

Any type of shared resource, including storage devices as discussed in reference to FIGS. 3–10, capable of being accessed over a network or communication bus may be utilized in accordance with the present invention. By way of example, the storage devices may be disk drives, tape drives, compact disc drives, RAID arrays, printers, video libraries or any other suitable type of resources.

In all its alternative embodiments the prevent invention provides greater flexibility and reliability than prior art cluster systems. Independent arbitration allows for scalability in terms of the number of servers or computers that may belong to a cluster. Extending the concept of independent arbitration, reciprocal cluster arbitration produces cluster administration systems that provide a greater amount of reliability. Clustering also provides functionality that were previously not possible.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A cluster of computing devices comprising:

a resource; and a plurality of computing devices in communication with each other, wherein each of the plurality of computing devices are directly coupled to the resource, a one of the plurality of computing devices being an owner of the resource, the owner controlling direct access to the resource by the plurality of computing devices, the cluster of computing devices including one or more computing devices, and the cluster of computing devices providing a network with indirect access to the resource;

wherein an independent computing device, independent of the cluster of computing devices, is in communication with the cluster of computing devices and configured to admit another computing device into the cluster of computing devices if the other computing device is capable of communicating with the independent computing device.

2. The cluster of computing devices of claim 1, wherein the independent computing device determines which of the plurality of computing devices is the owner.

3. The cluster of computing devices of claim 2, wherein the owner is also configured to admit the other computing device if the other computing device is capable of communicating with the owner through the network.

4. The cluster of computing devices of claim 3, wherein the independent computing device is configured to admit the other computing device if the other computing device fails to obtain admission through the owner, and the other computing device is capable of communicating with the independent computing device.

5. A cluster administration system comprising:
a cluster of computing devices including,
a resource, and
a plurality of computing devices in communication with each other, wherein each of the plurality of computing devices are directly coupled to the resource, a one of the plurality of computing devices being an owner of the resource, the owner controlling the direct access by the plurality of computing devices to the resource, the cluster of computing devices providing a network with indirect access to the resource; and
an arbiter, the arbiter being independent of the cluster of computing devices, configured to admit another computing device to the cluster of computing devices if the other computing device is in communication with the arbiter.

6. The cluster administration system of claim 5, wherein the arbiter determines which of the plurality of computing devices is the owner.

7. The cluster administration system of claim 5, wherein the owner is also configured to admit the other computing device if the other computing device is capable of communicating with the owner through the network.

8. The cluster administration system of claim 6, wherein the arbiter is configured to admit the other computing device if the other computing device fails to obtain admission through the owner, the other computing device capable of communicating with the arbiter.

9. The cluster administration system of claim 5 further comprising an independent computing device, wherein the arbiter is a process implemented on the independent computing device in communication with the cluster of computing devices, the independent computing device being independent of the cluster of computing devices.

10. The cluster administration system of claim 5 further comprising a plurality of independent computing devices, wherein the arbiter is a distributed process implemented on the plurality of independent computing devices in communication with the cluster of computing devices, the plurality of independent computing devices being independent of the cluster of computing devices.

11. The cluster administration system of claim 10, wherein the arbiter is primarily implemented on a first independent computing device of the plurality of independent computing devices, the first independent computing device configured to admit another computing device to the cluster of computing devices if the other computing device is in communication with the arbiter.

12. The cluster administration system of claim 11, wherein the owner is also configured to admit the other computing device if the other computing device is capable of communicating with the owner through the network.

13. The cluster administration system of claim 12, wherein the first independent computing device is configured to admit the other computing device if the other computing device fails to obtain admission through the owner, the other computing device capable of communicating with the first independent computing device.

14. The cluster administration system of claim 13, wherein if the first independent computing device loses communication with the cluster of computing devices, the arbiter is primarily implemented on a second independent computing device of the plurality of independent computing devices, the second independent computing device configured to administer the admission of the other computing device.

15. The cluster administration system of claim 10, wherein the plurality of independent computing devices is an independent cluster of computing devices.

16. The cluster administration system of claim 5, wherein a first computing device of the cluster of computing devices performs a function, and if the first computing device is not capable of significantly performing the function the arbiter assigns a second computing device of the computing devices to perform the function.

17. The cluster administration system of claim 16, wherein the first computing device notifies the arbiter that the first computing device cannot significantly perform the function such that the arbiter assigns the second computing device to perform the function.

18. A method of administering a cluster of computing devices, the cluster including a plurality of computing devices and a resource, the plurality of computing devices having direct access to the resource, wherein one of the plurality of computing devices is an owner of the resource, the owner controlling direct access to the resource by the other computing devices of the plurality of computing devices, the cluster of computing devices providing a network with access to the resource, the method comprising:
another computer device requesting admission into the cluster of computing devices from an arbiter that is not included in the cluster of computing devices.

19. The method of claim 18 further comprising:
the other computing device initially requesting admission into the cluster of computing devices from the owner through the network; and
admitting the other computing device to the cluster of computing devices if the other computing device successfully communicates with the owner;
such that the owner does not need to contend for ownership over the resource with the other computing devices.

20. The method of claim 18 further comprising:
admitting the other computing device into the cluster of computing devices if the other computing device successfully requests admission from the arbiter after the other computing device fails to successfully communicate with the owner.

21. The method of claim 18 further comprising:
determining which one of the plurality of computing devices is the owner.

22. The method of claim 18 further comprising:

determining if the owner is active; and assigning ownership over the resource to a next computing device of the plurality of computing devices if the owner is not active, the next computing device being a new owner.

23. The method of claim 18, wherein the arbiter is implemented on a computing device independent of the cluster of computing devices.

24. The method of claim 18, wherein the arbiter is implemented on a second cluster of computing devices, a first computing device of the second cluster of computing devices acting as the arbiter, the method further comprising:

transferring the duties of the arbiter to a second computing device of the second cluster of computing devices if the first computing device fails or losses communication with the cluster of computing devices.

25. A computer program product for administering a cluster of computing devices, the cluster of computing devices including a plurality of computing devices and a resource, the plurality of computing devices having direct access to the resource, wherein one of the plurality of computing devices is an owner of the resource, the owner controlling direct access to the resource by the other computing devices of the plurality of computing devices, the cluster of computing devices providing a network with access to the resource, the computer program product comprising:

a first computer code that enables a first independent computing device that is not included in the cluster of computing devices to receive requests through the network from another computing device to be admitted to the cluster of computing; and a computer readable medium that stores the first computer code.

26. The computer program product of claim 25 further comprising:

a second computer code that enables the first independent computing device to admit the other computing device into the cluster of computing devices if the other computing device successfully requests admission from the first independent computing device after the other computing device failed to successfully communicate with the owner for admission;

the computer readable medium further storing the second computer code.

27. The computer program product of claim 25 further comprising:

a third computer code that enables the first independent computing device to determine which one of the plurality of computing devices is the owner;

the computer readable medium further storing the third computer code.

28. The computer program product of claim 26 further comprising:

a fourth computer code that enables the second independent computing device to receive requests for admission and admit the other computing device when the first independent computing device fails or losses communication with the cluster of computing devices; and a fifth computer code that enables the second independent computing device to determine which one of the plurality of computing devices is the owner;

the computer readable medium further storing the fourth and fifth computer codes.

29. A computer program product for administering a cluster of computing devices, the cluster of computing devices including a plurality of computing devices and a resource, the plurality of computing devices having direct access to the resource, wherein one of the plurality of computing devices is an owner of the resource, the owner controlling the direct access to the resource by the other computing devices of the plurality of computing devices, the cluster of computing devices providing a network with access to the resource, the computer program product comprising:

a first computer code that enables the owner to manage direct access to the resource by the plurality of computing devices when the plurality of computing devices includes more than two computing devices, including the owner; and a computer readable medium that stores the first computer code.

30. The computer program product of claim 29 further comprising:

a second computer code that enables the owner to receive requests from another computing device to be admitted to the cluster of computing devices through the network, wherein the other computing device is communicatively coupled to the cluster of computing devices and the network;

the computer readable medium further storing the second computer code.

31. The computer program product of claim 30 further comprising:

a third computer code that enables the owner to admit the other computer to the cluster of computing devices through the network;

the computer readable medium further storing the third computer code.

32. The computer program product of claim 29 further comprising:

a fourth computer code that enables the owner to communicate with a first independent computing device, wherein the first independent computing device is communicatively coupled to the cluster of computing devices and the network;

the computer readable medium further storing the fourth computer code.

* * * * *